United States Patent

Stewart et al.

[11] Patent Number: 6,000,585
[45] Date of Patent: Dec. 14, 1999

[54] HOUSEWARE DISPENSER AND SEALING DEVICE

[75] Inventors: Frances Todd Stewart, Pittsburgh, Pa.; Raymond Ho-Cheong Cheng, Hong Kong, China

[73] Assignee: Creative Products International, Pittsburgh, Pa.

[21] Appl. No.: 09/040,875

[22] Filed: Mar. 18, 1998

[51] Int. Cl.[6] .............................. A47G 19/24; B67D 3/00; B65D 53/00

[52] U.S. Cl. ........................ 222/565; 222/480; 222/542; 220/304; 220/378

[58] Field of Search ..................... 222/478, 480, 222/565, 542; 220/304, 795, 806, 378

[56] References Cited

U.S. PATENT DOCUMENTS

| | | | |
|---|---|---|---|
| 857,698 | 6/1907 | Weissenthanner | 220/806 |
| 899,429 | 9/1908 | Noyes | 220/806 |
| 1,068,446 | 7/1913 | Pullen et al. | 222/565 |
| 1,628,082 | 5/1927 | Vincke | 220/806 |
| 1,705,445 | 3/1929 | Gitterman | 220/806 |
| 2,438,671 | 3/1948 | Marana | 288/33 |
| 2,480,096 | 8/1949 | Hoffman | 222/542 |
| 2,551,203 | 5/1951 | Wheaton | 222/542 |
| 3,338,456 | 8/1967 | Kinnavy et al. | 220/806 |
| 3,476,287 | 11/1969 | Kinnavy | 220/806 |
| 4,625,890 | 12/1986 | Galer | 220/795 |
| 4,817,964 | 4/1989 | Black, Jr. | 277/1 |

Primary Examiner—Joseph A. Kaufman
Assistant Examiner—Keats Quinalty
Attorney, Agent, or Firm—Andrew J. Cornelius

[57] ABSTRACT

A dispenser or shaker is used to store and dispense powdery or granular substances, and a sealing device for the shaker forms a seal against the escape of the substance between the lid and the shaker body. The lid can be placed around the mouth of the shaker body, and they can be rotated relative to one another to "lock" the lid onto the shaker body. The lid contains a number of dispensing holes through which the powdery or granular substance contained within the container body may be dispensed. The sealing device is located within the sealing lid, and provides a seal between the lid and the container body to prevent the powdery or granular substance from being ejected from the space between the sealing lid and the container body. The sealing device includes an inner and an outer ring made of materials that allow effective mounting of the device within the lid and formation of an effective seal, yet that provide for easy removal of the sealing device for cleaning.

15 Claims, 4 Drawing Sheets

HOUSEWARE DISPENSER AND SEALING DEVICE

BACKGROUND OF THE INVENTION

The present invention relates to containers, and more particularly to a sealing device and to a houseware dispenser or shaker that is used to store and dispense powdery or granular substances.

It is oftentimes desirable to add powdery or granular spices or other powdery or granular food additives of varying consistency to food that is being prepared for consumption. It is well known in the art to use a dispenser or shaker in which openings or dispensing holes are formed, through which the powdery or granular substance passes as it is dispensed. It is also well known in the art to provide a shaker with a removable lid to provide access to the interior of the shaker. The removable lid allows the shaker to be filled and cleaned. This feature is very important in restaurant businesses and food industries.

Oftentimes a removable lid is used that is threaded onto the body of a shaker. However, restaurants often use many shakers, and the time required to thread and unthread the lids to fill and clean the shakers can be burdensome. Also, the substance within the body of the shaker tends to accumulate over time in the threads of the threaded lid when the shaker is inverted to dispense the substance, which makes it more difficult to clean and to remove and replace the threaded lid. Also, as the powdery or granular substance accumulates in the threading of the lid it often migrates out of the shaker through the space between the lid and the body of the shaker when the shaker is used.

Therefore, the restaurant industry often uses shakers that have removable lids that do not need to be threaded onto the shaker body. Lids of this type are more quickly and easily removable, so that the shakers may be filled and cleaned more quickly than shakers with threaded lids. These types of shakers also present a more smooth and sleek appearance than threaded shakers, and are often deemed more visually attractive than threaded shakers, making them more desirable in the restaurant and food industries.

However, shakers having lids that are not threaded have a greater tendency to allow powdery or granular substances to leak out of the container through the space between the lid and the body of the shaker. Therefore, there is a need for a shaker with a lid that is not threaded, and that prevents the powdery or granular substance within the shaker from migrating from the shaker during use.

A seal may be placed within the lid to prevent powdery or granular substances within the shaker from migrating from the shaker between the lid and the shaker body. The seal must be easily removable to allow for quick and effective cleaning, yet it must be rigid enough so it can be seated well. Yet it must be malleable enough to form an effective seal between the lid and the shaker body. Also, the seal must be able to maintain its sealing ability over time, and not be easily deformed permanently as a result of its frequent removal from the shaker for cleaning purposes.

Therefore, there is a need for a shaker for dispensing powdery or granular substances with a lid that is easily and quickly removable, that seals against the migration of powdery or granular substances between the body of the shaker and the lid when the shaker is being used, and which seal can be removed for cleaning purposes.

SUMMARY OF THE INVENTION

The present invention substantially departs from the conventional concepts and designs of known dispensers, shakers and seal devices used in storing and dispensing powdery and granular substances, such as cocoa. No known dispenser, shaker and seal device provides the benefits and attributes of the present invention. Additionally, conventional shakers and seal devices do not suggest the present inventive combination of component elements arranged and configured as disclosed and claimed herein.

The present invention provides a houseware dispenser or shaker for containing and dispensing powdery or granular substances, that includes a container body for storing powdery or granular substances, the container body defining a mouth, a removable lid for covering the mouth, the lid defining dispensing holes, and a removable sealing device disposed within the dispenser to form a seal between the lid and the mouth of the container body.

The present invention provides a shaker for containing and dispensing powdery or granular substances, that includes a container body for storing powdery or granular substances, the container body defining a mouth, a removable lid for covering the mouth, the lid defining dispensing holes, and a removable sealing device disposed within the lid to form a seal between the lid and the mouth of the container body. The lid of the shaker device may define embossed lettering that identifies the contents of the shaker. The shaker device preferably includes a pair of keyways or indentations located in the container body adjacent opposite sides of the mouth, and a pair of keys or projections located on the interior surface of the lid, and projecting inwardly from the inner surface of the lid, the keyways and the keys cooperating to secure the lid onto the container body. The shaker device may also include an outer protective lid that can be fit over the sealing lid to prevent powdery or granular material from being dispensed through the dispensing holes.

The lid of the shaker device can define dispensing holes of approximately 1.5 mm diameter. The dispensing holes preferably are configured in a patterned arc, to focus the flow of the powdery or granular substance from the shaker device and to therefore minimize the unwanted residual spread of the powdery or granular substance to unwanted areas.

The present invention also provides a shaker device that includes a sealing device including an inner component of rigid material and an outer component of flexible material which fits around the inner component. The outer component material may be PVC plastic material, rubber or silicon, and the inner component material may be ABS, styrene and polycarbonate plastic material.

The present invention also provides a sealing device that includes an inner and outer component, the outer component being mounted in a groove defined by the periphery of the inner component.

DETAILED DESCRIPTION OF THE PREFERRED EMBODIMENT

Figure 1:
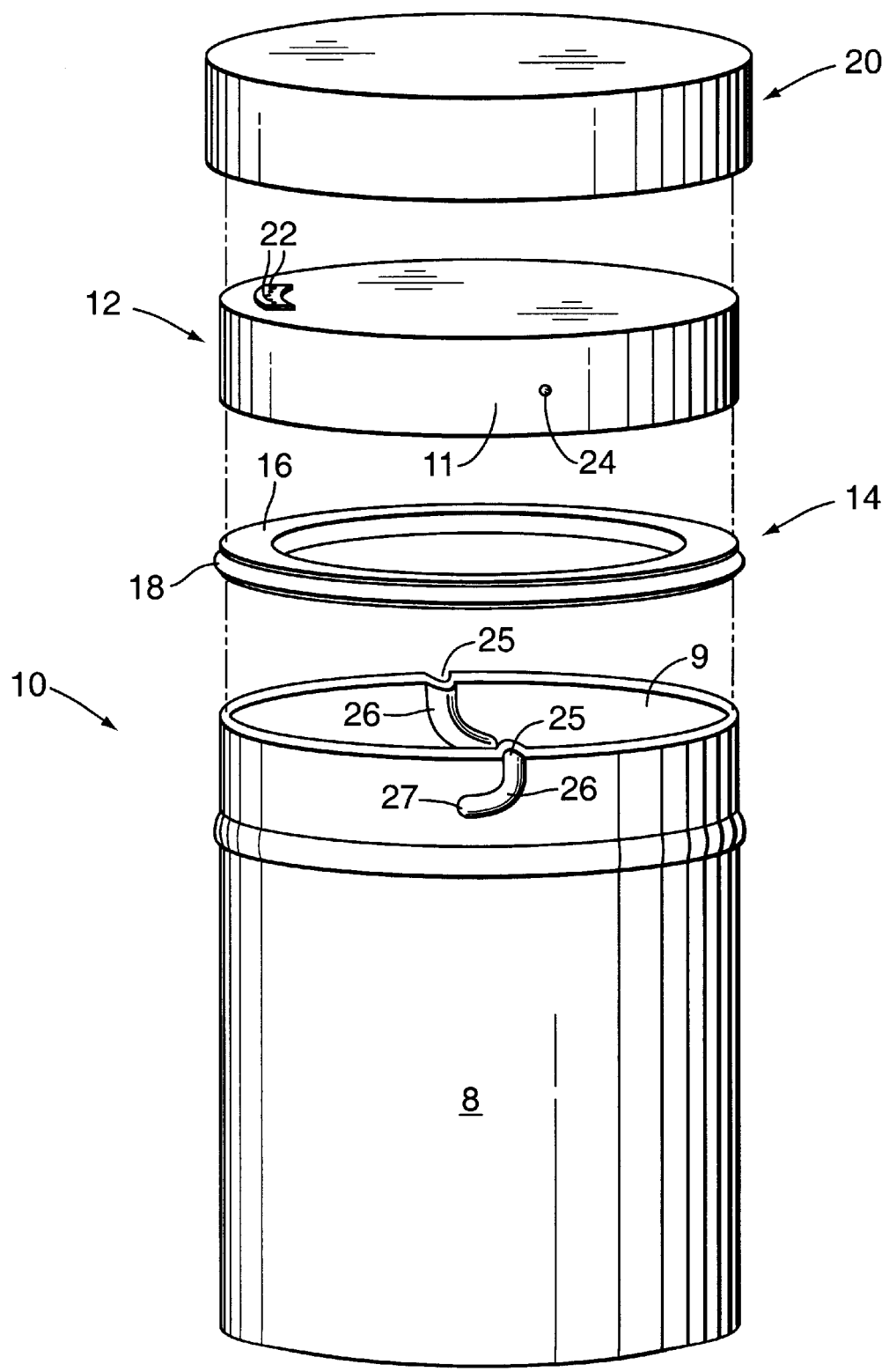
FIG. 1 is a perspective exploded view of a spice shaker device provided by the present invention.
Figure 2:
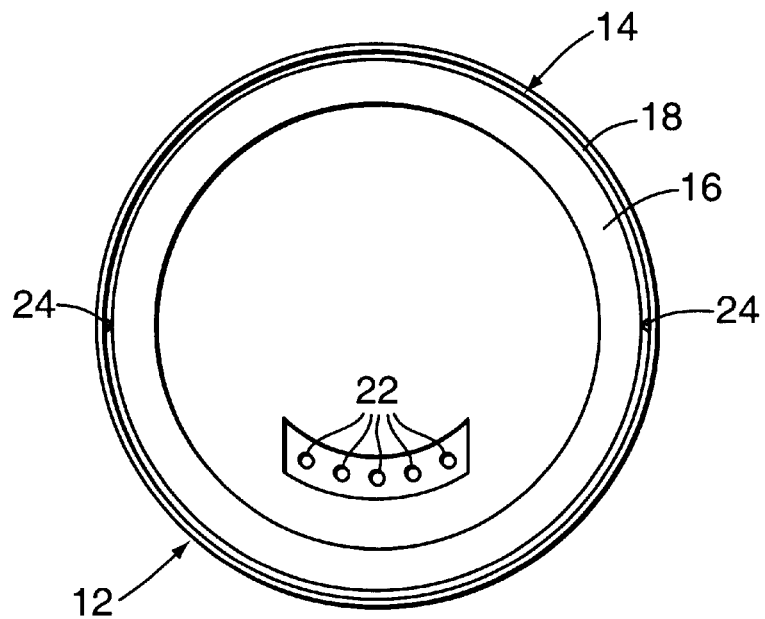
FIG. 2 is a view of the underside of the removable lid of the shaker device shown in FIG. 1.

The present invention provides a dispenser or shaker that is particularly useful for storing and dispensing powdery and granular substances, and a sealing device that can be used to create a seal between the body and lid of the shaker. The appended drawing shows one embodiment of each that is useful as or with a spice shaker.

The spice shaker, generally designated by numeral 10, includes a body 8, a removable sealing lid 12, and a sealing device 14. Body 8 and lid 12 can be made of stainless steel or any suitable metal or plastic. Shaker 10 is particularly useful for dispensing powdery or granular spices and other powdery or granular substances and food additives. Body 8 contains the substance, which is loaded into and dispensed from shaker 10 through mouth 9 defined by body 8. Lid 12 is secured to body 8 using keyways 26 formed in body 8 near mouth 9, and keys 24 formed in the sides 11 of lid 12. Sealing lid 12 is easily and quickly mounted to and removed from body 8, and sealing device 14 seals against the migration of powdery or granular substances from body 8 between mouth 9 and lid 12 when shaker 10 is being used. Sealing device 14 may be easily removed from lid 12 for cleaning purposes.

The substance is contained within generally cylindrical body 8 of shaker 10 and is released from shaker 10 through mouth 9 and openings or holes 22 formed in sealing lid 12 when shaker 10 is inverted, and shaken. A protective outer lid 20 is also provided, which is designed to fit over sealing lid 12 and to prevent the substance from passing through openings 22, and also to prevent any foreign matter from entering shaker 10 through openings 22. Protective outer lid 20 is removable from sealing lid 12 and may be made from plastic.

Body 8 of shaker 10 defines a pair of keyways or indentions 26 in container body 8 at or near mouth 9, and lid 12 defines a pair of mating keys or projections 24 formed on the interior surface of lid 12, and projecting inwardly from the inner surface of lid 12. Keyways 26 and keys 24 are designed to mate with each other to allow sealing lid 12 to be "locked" onto body 8 of shaker 10, without the need for providing threads and threading lid 12 onto body 8.

A sealing device 14 is seated within lid 12 and is configured to form a seal between sealing lid 12 and mouth 9 of body 8 of shaker 10 to prevent the substance within shaker 10 from migrating from shaker 10 between body 8 and lid 12 when shaker device 10 is inverted to dispense the substance from within body 8 through openings 22. Seal 14 may be removed from sealing lid 12 to allow for the cleaning of lid 12 and seal 14 and to remove any of the powdery or granular substance which may have become trapped between sealing lid 12 and seal 14.

Figure 3:
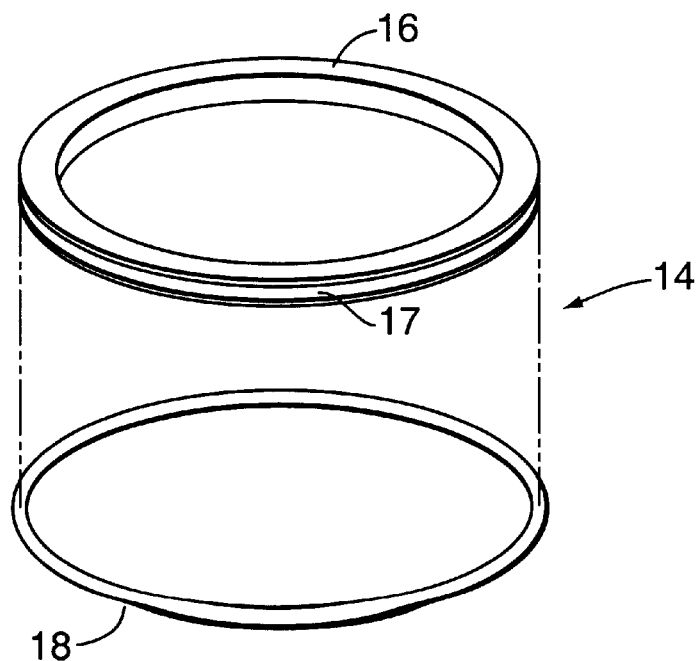
FIG. 3 is a side exploded view of the sealing device provided by the present invention.

Referring now to FIG. 3, seal 14 includes an outer ring 18 and an inner ring 16. Inner ring 16 is formed from such sturdy, rigid materials as, preferably, ABS, polycarbonate and styrene plastic materials. Inner ring 16 defines an indented groove 17 along its outer periphery. Outer ring 18 is configured and sized to allow it to be seated firmly within groove 17 without the need for gluing, and, thus, to encircle inner ring 16. Outer ring 18 is formed from a suitable, flexible, malleable material, such as PVC plastic, rubber or silicon. The malleability of seal 14 allows it to fit snugly inside sealing lid 12 and to deform to the extent necessary to seal the space between body 8 of shaker device 10 and sealing lid 12 when sealing lid 12 is secured onto body 8 of shaker device 10 using keyways 26 and keys 24. The rigidity of the material from which inner ring 16 is formed allows it to be wedged into place at the top of lid 12, and to remain securely mounted in place until its removal is desired. Seal 14 is configured and mounted to prevent the contents of shaker device 10 from escaping from the space between sealing lid 12 and body 8 when shaker device 10 is inverted and shaken. Seal 14 can be cleaned after it is removed from lid 12 by separating and removing outer ring 18 from inner ring 16.

Figure 4:
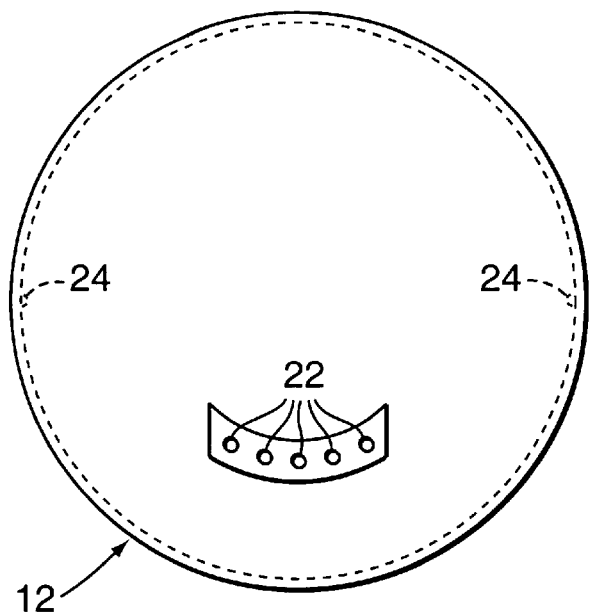
FIG. 4 is a top plan view of the removable lid shown in FIG. 1.
Figure 5:
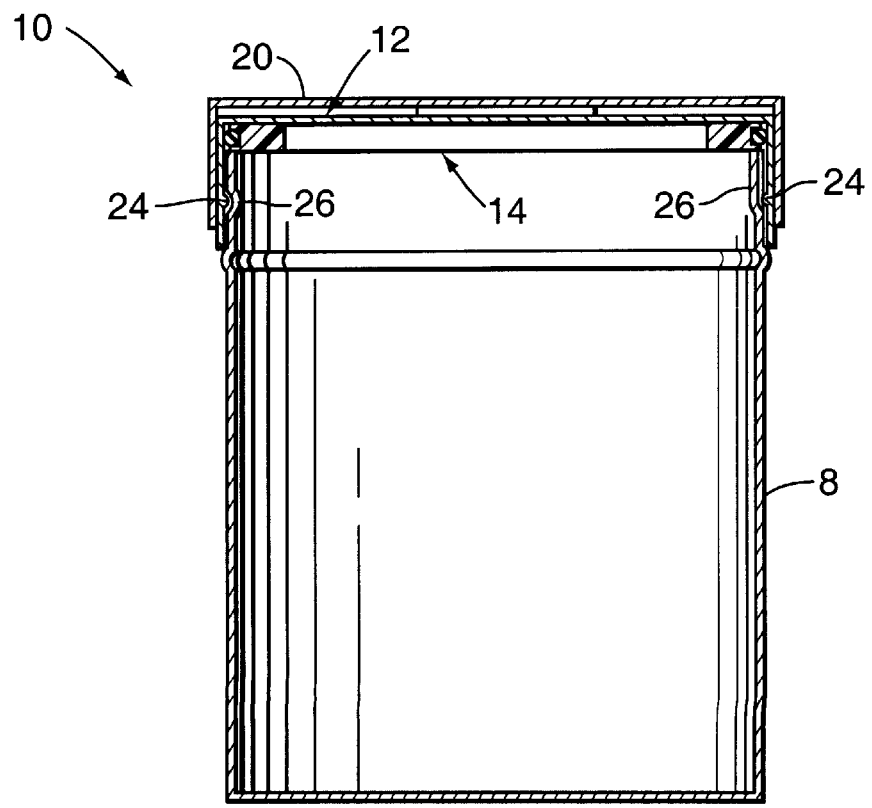
FIG. 5 is a section view of the shaker device shown in FIG. 1.
Figure 6:
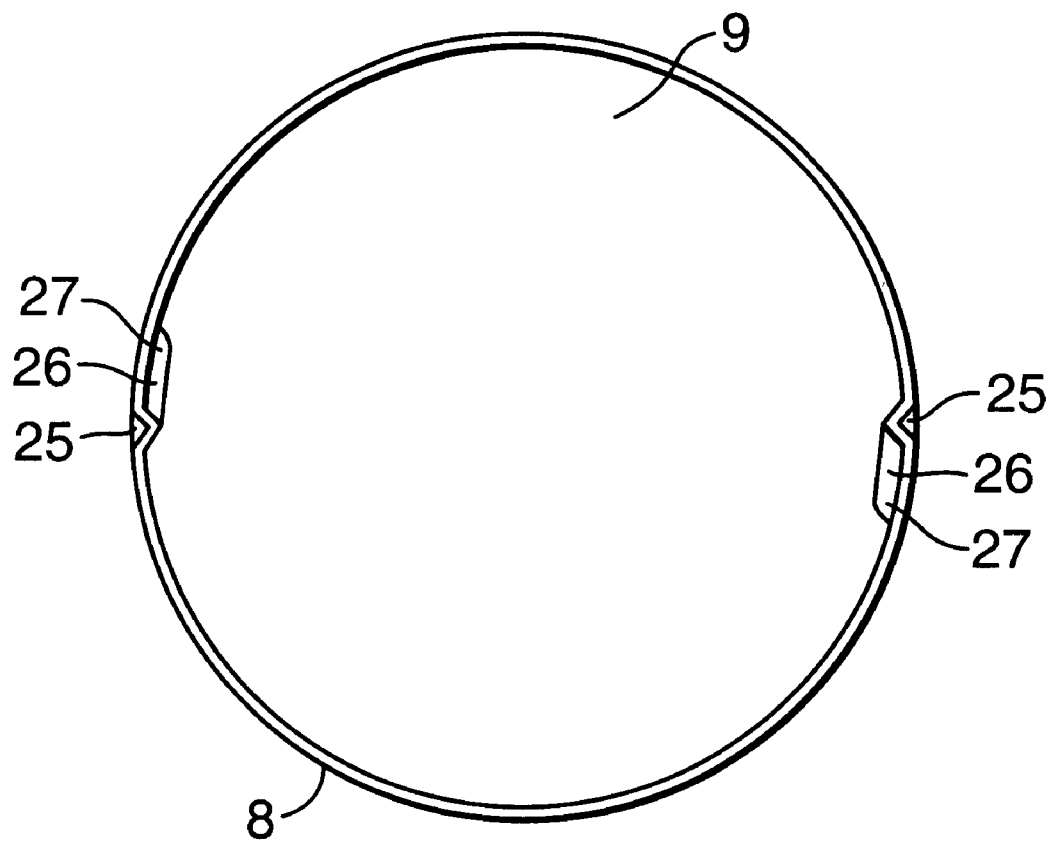
FIG. 6 is a top view of the body of the shaker device shown in FIG. 1.

Referring now to FIG. 4, a limited number of openings or dispensing holes 22 are formed in sealing lid 12 and are arranged in a configuration that allows for more even and accurate dispensing of the contents of shaker 10 onto a desired surface. The dispensing holes 22 preferably are configured in a patterned arc, to focus the flow of the powdery or granular substance from the shaker device 10, and to therefore minimize the unwanted residual spread of the powdery or granular substance onto unwanted areas. The number of openings 22 and size of each opening 22 in lid 12 will depend on the particle size of the substance that will be dispensed from shaker 10. Five openings 22, each preferably 1.5 mm in diameter, should be provided in lid 12 when shaker 10 is used to dispense most powdery or granular substances. Additionally, removable lid 12 may contain embossed lettering (not shown) identifying the spice or powdery or granular food substance contained within shaker 10.

A powdery or granular food substance, such as cocoa, can be placed within shaker 10 through mouth 9 in container body 8. After shaker 10 is filled as desired, lid 12 is placed over the mouth of body 8, and lid 12 and body 8 are aligned until each key 24 is aligned with entry 25 of a corresponding keyway 26. Lid 12 is fit over mouth 9 until keys 24 enter entries 25 and begin to travel along keyway 26 until keys 24 reach terminus 27, at which point lid 12 is secured onto body 8. Shaker 10 may then be inverted and shaken to allow the spice or powdery or granular food substance to be dispensed from shaker 10 through dispensing holes 22.

Shaker 10 can be opened and refilled or cleaned by rotating body 8 and lid 12 relative to one another in a direction opposite to the direction in which they were rotated to "lock" lid 12 onto body 8. When keys 24 and keyway entries 25 are aligned, lid 12 is removed from body 8, keys 24 passing out entries 25. Seal 14 can be easily and simply withdrawn from within lid 12, so that the interior of lid 12 may be wiped clean. Inner ring 16 may be easily "popped" from outer ring 18, so that outer ring 18 is no longer in indented groove 17, and both rings can be cleaned.

According to the provisions of the patent statutes, we have explained the principal, preferred construction and mode of operation of my invention and have illustrated and described what we now consider to represent its best embodiment. However, it should be understood that, within the scope of the appended claimed, the invention may be practiced otherwise than as specifically illustrated and described.

What is claimed is:

1. A dispenser for containing and dispensing substances, said dispenser comprising:

a container body for storing the substance, said container body defining a mouth;

a lid defining at least one dispensing hole, said lid being configured to removably cover said mouth; and a sealing device disposed between said lid and said container body, said sealing device being configured and located to provide a seal between said lid and said mouth of said container body, said sealing device defining an opening that allows passage of the substance through said at least one dispensing hole;

said sealing device including two components capable of being mounted to each other, wherein a first said component of said sealing device defines a mounting and a second said component of said sealing device can be seated within said mounting.

2. The dispenser recited by claim 1 wherein said components of said sealing device comprise:

an inner component and an outer component;

said inner component being configured of rigid material and defining a groove along its periphery;

said outer component being configured of flexible material and being configured and disposed to be mounted within said indented groove of said inner component.

3. The dispenser recited by claim 2 wherein said dispenser defines a keyway being configured and disposed as an indentation and a key being configured and disposed as a projection, said key being configured and disposed to enter and rotate within said keyway to secure said lid onto said container body as said container body and said lid are rotated relative to one another.

4. The dispenser recited by claim 3 further comprising:

an outer protective lid that is configured and disposed to fit over said sealing lid, said outer lid being configured and disposed to prevent powdery or granular material from being dispensed through said at least one dispensing hole.

5. The dispenser recited by claim 4 wherein said lid defines more than one dispensing hole, each of said dispensing holes being approximately 1.5 mm in diameter.

6. The dispenser recited by claim 5 wherein said sealing lid comprises embossed lettering to identify the powdery or granular substance contained within said container body.

7. The dispenser recited by claim 2 wherein said outer component is a ring and is comprised of PVC plastic material.

8. The dispenser recited by claim 2 wherein said outer component is a ring and is comprised of rubber material.

9. The dispenser recited by claim 2 wherein said outer component is a ring and is comprised of silicon material.

10. The dispenser recited by claim 2 wherein said inner component is a ring and is comprised of ABS plastic material.

11. The dispenser recited by claim 2 wherein said inner component is a ring and is comprised of styrene plastic material.

12. The dispenser recited by claim 2 wherein said inner component is a ring and is comprised of polycarbonate plastic material.

13. The dispenser recited by claim 1 wherein said mounting is a groove defined along the periphery of said first component.

14. A shaker device for containing and dispensing substances comprising:

a container body for storing substances, said container body defining a mouth;

a lid defining at least one dispensing hole, said lid being configured to removably cover said mouth; and a sealing device disposed within said lid, said sealing device being configured and located to form a seal between said lid and said mouth of said container body;

said sealing device comprising:

an inner ring and an outer ring;

said inner ring being formed of rigid material and defining a groove along its periphery;

said outer ring being formed of flexible material and being configured and disposed to be mounted within said indented groove of said inner ring.

15. A houseware dispenser device for containing and dispensing substances, said houseware dispensing device comprising:

a container body for storing substances, said container body defining a mouth;

a lid defining at least one dispensing hole, said lid being configured to removably cover said mouth; and a sealing device disposed between said lid and said container body, said sealing device being configured and located to provide a seal between said lid and said mouth of said container body;

said sealing device including two components capable of being mounted to each other, wherein a first said component of said sealing device defines a mounting and a second said component of said sealing device can be seated within said mounting.

* * * * *